US012411063B2

(12) United States Patent
Shiralkar et al.

(10) Patent No.: US 12,411,063 B2
(45) Date of Patent: Sep. 9, 2025

(54) APPARATUS AND METHOD FOR AUTOMATED MICRODISSECTION OF TISSUE FROM SLIDES TO OPTIMIZE TISSUE HARVEST FROM REGIONS OF INTEREST

(71) Applicant: Pramana, Inc., Cambridge, MA (US)

(72) Inventors: Manish Shiralkar, Pune (IN); Jithin Prems, Dooravani Nagar (IN); Raghubansh Bahadur Gupta, Bangalore (IN); Prasanth Perugupalli, Cary, NC (US); Jaya Jain, Bhopal (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/652,236

(22) Filed: May 1, 2024

(65) Prior Publication Data

US 2024/0426716 A1    Dec. 26, 2024

Related U.S. Application Data

(60) Provisional application No. 63/499,432, filed on May 1, 2023.

(51) Int. Cl.
*G01N 1/28* (2006.01)
*G01N 35/00* (2006.01)
(Continued)

(52) U.S. Cl.
CPC ....... *G01N 1/286* (2013.01); *G01N 35/00029* (2013.01); *G06T 7/0012* (2013.01);
(Continued)

(58) Field of Classification Search
CPC ............... G06T 7/0012; G06T 7/10; G06T 2207/20084; G06T 2207/30024;
(Continued)

(56) References Cited

U.S. PATENT DOCUMENTS 8,189,882 B2    5/2012  deLa Torre Bueno
10,453,195 B2   10/2019 Gholap et al.
(Continued)

OTHER PUBLICATIONS

Extended European Search Report; EP24173658.6; Date: Sep. 9, 2024.

*Primary Examiner* — Stephen R Koziol
*Assistant Examiner* — Ashley L. Hytrek
(74) *Attorney, Agent, or Firm* — Caldwell Intellectual Property Law

(57) ABSTRACT

An apparatus and method for automated microdissection of tissue from slides to optimize tissue harvest from regions of interest are disclosed. The apparatus includes at least a processor and a memory communicatively connected to the at least a processor, wherein the memory contains instructions configuring the at least a processor to receive a stained input slide, identify a region of interest on the stained input slide, generate a segmentation map of the region of interest as a function of a segmentation algorithm, register a segmented region of interest, as a function of the segmentation map, onto an unstained slide, wherein registering the segmented region of interest includes determining an orientation of the unstained slide corresponding to the segmented region of interest of the stained input slide, recording the orientation of the unstained slide relative to a reference plane, and registering the segmented region of interest to the unstained slide.

18 Claims, 11 Drawing Sheets

(51) Int. Cl.
  *G06T 7/00* (2017.01)
  *G06T 7/10* (2017.01)
(52) U.S. Cl.
  CPC ...... *G06T 7/10* (2017.01); *G06T 2207/20084* (2013.01); *G06T 2207/30024* (2013.01)
(58) Field of Classification Search
  CPC ............. G06T 7/11; G06T 7/12; G01N 1/286; G01N 35/00029; G01N 2001/282; G06N 3/02
  See application file for complete search history.

(56) References Cited

U.S. PATENT DOCUMENTS

| | | | |
|---|---|---|---|
| 10,684,461 B2 * | 6/2020 | Boamfa | G02B 21/12 |
| 2017/0328817 A1 * | 11/2017 | Barnes | G01N 1/286 |
| 2018/0267290 A1 * | 9/2018 | Boamfa | G02B 21/34 |
| 2018/0340870 A1 | 11/2018 | Gustafson et al. | |
| 2019/0355113 A1 * | 11/2019 | Wirch | G06T 7/32 |
| 2020/0372235 A1 * | 11/2020 | Peng | G06T 7/0012 |
| 2021/0001327 A1 | 1/2021 | Pierik et al. | |
| 2021/0064845 A1 | 3/2021 | Stumpe et al. | |
| 2021/0166785 A1 | 6/2021 | Yip et al. | |
| 2024/0192097 A1 * | 6/2024 | Strassen | G06T 7/168 |

* cited by examiner

APPARATUS AND METHOD FOR AUTOMATED MICRODISSECTION OF TISSUE FROM SLIDES TO OPTIMIZE TISSUE HARVEST FROM REGIONS OF INTEREST

CROSS-REFERENCE TO RELATED APPLICATIONS

This application claims the benefit of priority of U.S. Provisional Patent Application Ser. No. 63/499,432, filed on May 1, 2023, and titled "SYSTEMS AND METHODS FOR SCALABLE MACRODISSECTION OF TISSUE FROM SLIDES," which is incorporated by reference herein in its entirety.

FIELD OF THE INVENTION

The present invention generally relates to the field of tissue analysis. In particular, the present invention is directed to an apparatus and method for automated microdissection of tissue from slides to optimize tissue harvest from regions of interest.

BACKGROUND

Histological analysis of tissue specimens is used to evaluate the pathology of various kinds of diseases at the tissue and cellular level. For disease evaluation at a molecular level, nucleic acid extraction from specific tissue areas of interest is required to evaluate the pathology at the molecular level. One way to obtain tissue specimens for histological analysis (or for other purposes) is to perform tissue extraction from a slide. The tissue extracted may contain the tissue and cells that the researchers may or may not be interested in (e.g., tumor tissue). However, tissue extracted from a slide with a high concentration of tissue interest (e.g., tissue density) would be optimal as it would make it easier for the downstream molecular analysis.

Accordingly, there is a desire for improved techniques for extracting tissue of interest from the slides for downstream molecular testing to evaluate the disease process at a molecular level.

SUMMARY OF THE DISCLOSURE

In an aspect, an apparatus for automated microdissection of tissue from slides to optimize tissue harvest from regions of interest is disclosed. The apparatus includes at least a processor and a memory communicatively connected to the at least a processor, wherein the memory contains instructions configuring the at least a processor to receive a stained input slide, identify a region of interest on the stained input slide, generate a segmentation map of the region of interest as a function of a segmentation algorithm, register a segmented region of interest, as a function of the segmentation map, onto an unstained slide, wherein registering the segmented region of interest onto the unstained slide includes determining an orientation of the unstained slide corresponding to the segmented region of interest of the stained input slide, recording the orientation of the unstained slide relative to a reference plane, and registering the segmented region of interest to the unstained slide.

In another aspect, a method for automated microdissection of tissue from slides to optimize tissue harvest from regions of interest is disclosed. The method includes receiving, by at least a processor, a stained input slide, identifying, by the at least a processor, a region of interest on the stained input slide, generating, by the at least a processor, a segmentation map of the region of interest as a function of a segmentation algorithm, registering, by the at least a processor, a segmented region of interest, as a function of the segmentation map, onto an unstained slide, wherein registering the segmented region of interest onto the unstained slide includes determining an orientation of the unstained slide corresponding the segmented region of interest of the stained input slide, recording the orientation of the unstained slide relative to a reference plane and registering the segmented region of interest to the unstained slide.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for automated microdissection of tissue from slides to optimize tissue harvest from regions of interest. The apparatus includes at least a processor and a memory communicatively connected to the at least a processor, wherein the memory contains instructions configuring the at least a processor to receive a stained input slide, identify a region of interest on the stained input slide, generate a segmentation map of the region of interest as a function of a segmentation algorithm, register a segmented region of interest, as a function of the segmentation map, onto an unstained slide, wherein registering the segmented region of interest onto the unstained slide includes determining an orientation of the unstained slide corresponding to the segmented region of interest of the stained input slide, recording the orientation of the unstained slide relative to a reference plane, and registering the segmented region of interest to the unstained slide.

In an embodiment, apparatus can use advanced image processing and machine learning algorithms to accurately identify and segment regions of interest from both stained and unstained tissue slides.

Aspects of the present disclosure can be used to enhance the precision and efficiency of tissue analysis by enabling the selective extraction of specific tissue regions for detailed biological or pathological examination. Aspects of the present disclosure can also be used to facilitate the rapid processing of large volumes of slides, significantly reducing the manual effort and time required for tissue selection and extraction. This is so, at least in part, because the integration of computer vision models with mechanical positioning systems allows for the automated alignment and adjustment of slides, ensuring that the extraction process targets only the most relevant tissue areas based on predefined criteria.

Figure 1:
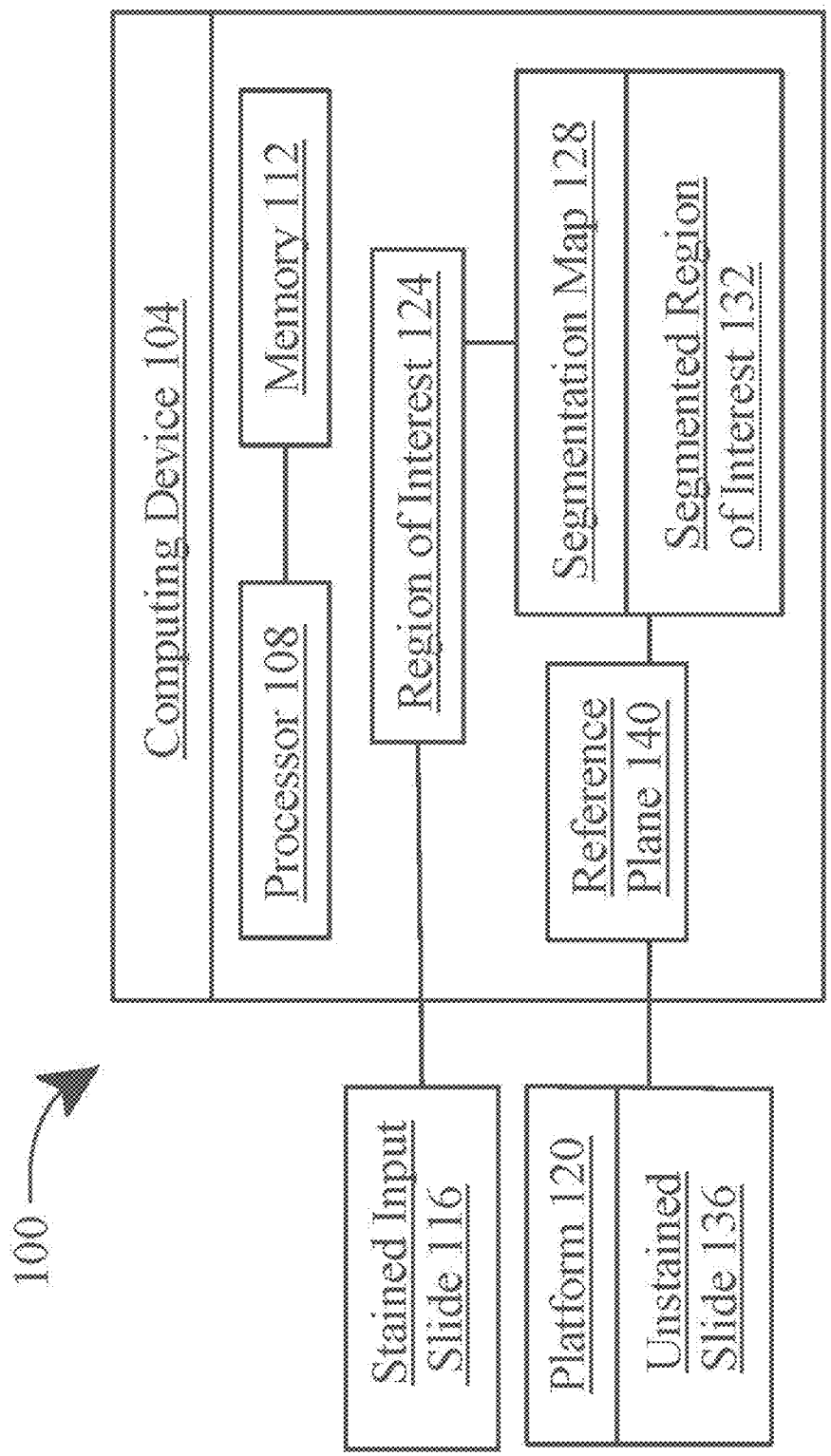
FIG. 1 illustrates a block diagram of an exemplary apparatus for automated microdissection of tissue from slides to optimize tissue harvest from regions of interest.

Referring now to FIG. 1, an exemplary embodiment of an apparatus 100 for automated microdissection of tissue from slides to optimize tissue harvest from regions of interest is illustrated. Apparatus 100 includes a computing device 104. Computing device 104 includes at least a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 104 may include any computing device as described in this disclosure, including without limitation a microcontroller, microprocessor, digital signal processor (DSP) and/or system on a chip (SoC) as described in this disclosure, computing device 104 may include, be included in, and/or communicate with a mobile device such as a mobile telephone or smartphone, computing device 104 may include a single computing device operating independently, or may include two or more computing device operating in concert, in parallel, sequentially or the like; two or more computing devices may be included together in a single computing device or in two or more computing devices, computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device, computing device 104 may include but is not limited to, for example, a computing device or cluster of computing devices in a first location and a second computing device or cluster of computing devices in a second location, computing device 104 may include one or more computing devices dedicated to data storage, security, distribution of traffic for load balancing, and the like, computing device 104 may of computing device, which may operate in parallel, in series, redundantly, or in any other manner used for distribution of tasks or memory between computing devices, computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks, computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine learning process may utilize supervised, unsupervised, lazy-learning processes and/or neural networks, described further below.

With continued reference to FIG. 1, apparatus 100 for automated microdissection of tissue from slides to optimize tissue harvest from regions of interest, apparatus 100 includes at least a processor 108 and memory 112 communicatively connected to the at least a processor 108, wherein memory 112 contains instruction configuring the at least a processor 108 to receive a stained input slide 116. As used in this disclosure, a "stained input slide" refers to a prepared thin section or specimen, for example, of biological origin, which has undergone a treatment process with one or more coloring agents or dyes to enhance the visibility, contrast, or differentiation of its components or structures. Examples may include, but are not limited to, slides treated with Hematoxylin and Eosin (H & E), among other stained methodologies, to highlight specific cellular and tissue features. In some embodiment, stained input slide 116 may be placed into a designated receiving slot, tray, or a platform.

Still referring to FIG. 1, apparatus 100 includes at least a processor 108 to identify a region of interest 124 on stained input slide 116. As used in this disclosure, a "region of interest" is a specific location or region within a sample or specimen that may draw particular attention due to its significance, relevance, or unique characteristics. In a non-limiting example, the region of interest 124 may be an area exhibiting disease or pathology, a tumor or neoplastic grown, a marked region on a patient's skin, a segment of tissue undergoing abnormal cellular changes, a lesion or area of inflammation, and the like. In a non-limiting example, to identify region of interest 124 on stained input slide 116, platform 120 may be configured to scan stained input slides 116 into digital slides to generate a segmentation map 128. Platform 120 described herein is further described below. As a non-limiting example, platform 120 may include a digital whole slide scanner. The digital slides may be a 2D image representation of the slides captured by a digital whole slide scanner. For example, and without limitation, the digital slide may be a whole slide image. The digital slides may be in a variety of formats (e.g., JPEG, PNG, TIFF), and the digital slide may be transmitted and received via a computer network. In a non-limiting example, stained input slide 116 may be prepared at a slide preparation platform. Illustrative process steps associated with slide preparation platform 120 may be shown in further detail in FIG. 6. Specifically, the process steps shown in FIG. 6 may be suitable for preparing a plurality of slides from the same slide group, where the slide group is composed of contiguous slices of tissue specimen drawn from a paraffin tissue block. Preparing a slide group with contiguous tissue slices may result in each of the slides having similar cross-sectional features (e.g., the locations of tissue boundaries may coincide). Advantageously, these similarities may enable one or more of the slides to be used as a reference slide, in which regions of interest may be identified, and the remaining slides to be used to harvest tissue associated with the regions of interest in a scalable manner, as further explained below with reference to FIGS. 6-9.

Still referring to FIG. 1, in some embodiments, identifying region of interest 124 on stained input slide 116 may further include extracting features, patterns, or characteristics of region of interest 124 using a supervised learning algorithm. As used in this disclosure, a "feature" is an attribute of data used for analysis, such as, but not limited to, texture, shape, color, or intensity within the image of the slide. Features may include variations in color intensity that distinguish cancerous cells from healthy cells, abnormal texture patterns representing different tissue types, or the shape and size of nuclei within the cells. The supervised learning algorithm may be configured to analyze these extracted features. As used in this disclosure, a "supervised learning algorithm" is a machine learning algorithm that learns a function mapping input data to output labels based on a set of training data. Exemplary training data may include pairs of input examples and the corresponding outputs. As a non-limiting example, training data may include correlations between exemplary images and exemplary features. As another non-limiting example, training data may include correlations between exemplary images and exemplary labels. For example, and without limitation, machine-learning model may be trained with training data including digital images of slides including pixels representation of color intensity, texture and shape as inputs, and outputs labels of the digital images of slides, indicating specific region of the slide containing region of interest; for instance, and without limitation, cancerous tissue or healthy tissue. Algorithm may analyze numerous examples of stained slide images.

With continued reference to FIG. 1, in an additional embodiment, identifying region of interest may include using a registration module to log a size of a sample from stained input slide 116. As used in this disclosure, a "registration module" is a component configured to register different datasets or images for further analysis. Registration module may include computational algorithms configured to detect and match patterns, landmarks, or features across different images or data sources. For example, without limitation, registration module may be configured to align images from serial sections of tissue or match stained and unstained slides of the same sample for comprehensive analysis. As used in this disclosure, a "size" is the physical dimensions the sample. The size may be expressed in various units depending on the measurement of the samples, such as nanometers (nm), millimeters (mm), or centimeters (cm). Size may refer to the actual area covered by the sample on the slide, the thickness of the tissue section, and the volume of a three dimensional (3D) structure present within the sample. For example, without limitation, a thin section of tissue might have a thickness of 5 micrometers (μm), which is equivalent to 5000 nanometers (nm), whereas the sample may cover an area of 15 mm by 15 mm on the slide. In a more complex analyses, volumetric measurements may be considered, especially for samples like organoids, which might occupy volumes measurable in cubic millimeters ($mm^3$). As used in this disclosure, a "sample" is a variety of biological materials prepared for analysis on slides. Samples may be "fresh-frozen," where tissue is rapidly frozen to preserve its cellular structure and molecular composition. Alternatively, samples may be "fixed," involving chemical treatments such as formalin fixation to preserve the tissue's architecture and prevent decay. The range of samples may include, but not limited to organisms (whole or parts thereof), organoids (3D cell cultures that mimic organ structures), to specific tissue samples such as skin biopsies.

With continued reference to FIG. 1, in some embodiments, processor 108 and/or registration module may be configured to analyze a section of tissue to measure a thickness of the tissue section and log the thickness of the tissue section. As a non-limiting example, processor 108 may analyze tissue section using a machine vision system to measure a thickness of tissue section. For the purposes of this disclosure, a "machine vision system" is a type of technology that enables a computing device to inspect, evaluate and identify still or moving images. Machine vision system disclosed herein is further described in detail below. In a non-limiting example, processor 108 and/or registration module may analyze a section of tissue using an image processing algorithm, edge detection algorithm, or the like of machine vision system to measure the thickness of tissue section. For example, and without limitation, machine vision system may identify pixels corresponding to upper and lower edges using an edge detection algorithm and calculating the distance between the upper and lower edges to measure the thickness. For example, and without limitation, machine vision system may measure density of pixels to measure the thickness. For example, and without limitation, processor 108 and/or registration module may measure the thickness of tissue section by comparing the tissue section with a tissue section thickness reference from a database, user, or the like. In some embodiments, processor 108 and/or registration module may document the thickness of tissue section. In a non-limiting example, processor 108 and/or registration module may document the thickness of tissue section and a number of slides sectioned for analysis. For example, and without limitation, each slide may include an average, greatest or lowest thickness documented.

With continued reference to FIG. 1, in a further embodiment, registration module may be configured to document a number of slides sectioned for analysis. As used in this disclosure, "number" is the total count or quantity of slides that is sectioned and prepared for analysis. Number may vary depending on research project scope, size of the sample, and the objectives of the analysis. For example, without limitation, researcher may section and prepare 20 slides from a single tissue block to exam different layers or regions of the tissue and label slides with sequential numbering system, such as "Slide 1 of 20," "Slide 2 of 20," and so forth, to indicate both the individual slide's position in the series and the total number of slides prepared. In another example, without limitation, for high-throughput studies, hundreds of slides may be generated and each slide may be labeled and cataloged for sequential analysis. In other embodiments, registration module may be configured to predict size and a location of the region of interest as a function of sample size and number of slides and register identified region of interest 124 across a plurality of unstained slides. As used in this disclosure, a "location" is a coordinate of the ROI within the sample or on a slide. Location may be described in two-dimensional (2D) terms, such as X and Y coordinates on a slide surface, or in three-dimensional (3D) terms, adding depth (Z) for volumetric samples. For example, without limitation, ROI may be located in 4 mm from the left edge and 3 mm from the top edge of slide number 5 in a series. As used in this disclosure, "unstained" refers to slides, samples, or other substrates derived from biological, clinical, or environmental origins that have not undergone additional processing, treatment, or alteration with coloring agents, dyes, or other chemical modifications. For example, samples may include but are not limited to, freshly excised specimens, cryogenically preserved samples without prior staining, and any other samples that retain their native or original appearance post-collection.

With continued reference to FIG. 1, at least a processor 108 is configured to generate a segmentation map 128 of region of interest 124 as a function of a segmentation algorithm. A "segmentation map" is a digital representation that delineates specific areas or features within an image. In the case of biomedical imaging, segmentation map 128 of stained input slide 116 may visually separate the ROI 112 from the surrounding tissue or background. Segmentation map may be presented as an overlay on the original image, with the segmented regions highlighted or color-coded for clarity. For example, without limitation, segmentation map may highlight tumor cell in one color and healthy tissue in another color or transparent within a tissue sample to present visual differentiation. A "segmentation algorithm" is a series of computational steps which may be applied to an image to identify and segregate different regions according to specific features, such as color, texture, intensity, or shape. In biomedical imaging, segmentation algorithms may be configured to recognize patterns indicative of particular tissue types, disease markers, or cellular structures. Segmentation algorithm may range from simple thresholding techniques that separate regions based on intensity levels to complex machine learning models that learn from annotated examples to accurately segment images. Segmentation algorithm may be configured to extract relevant features from the preprocessed image that are indicative of different regions as a function of texture, color distribution, edge information, or other morphological characteristics of the image. The initial segmentation results may be refined to improve accuracy, process may include removing small, irrelevant segments, filling in gaps within regions, and applying morphological operations to smooth edges.

With continued reference to FIG. 1, at least a processor 108 is configured to register a segmented region of interest 132, as a function of segmentation map 128, onto an unstained slide 136, wherein registering the segmented region of interest 132 onto unstained slide 136 includes determining an orientation of the unstained slide corresponding to segmented region of interest 132 of stained input slide 116. A "segmented region of interest" is a specific area within an image that has been isolated from the rest using segmentation algorithms. Segmented region of interest (ROI) 132 may include a cluster of cells, a particular tissue type, or a pathological lesion. For example, without limitation, segmented ROI may be areas showing signs of amyloid plaque accumulation, indicative of Alzheimer's disease. An "unstained slide" is a microscope slide containing a tissue sample that has not undergone any staining process. "Staining" is used in microscopy to enhance contrast in biological tissues, making certain structures more visible. Unstained slides may be used for various reasons, including comparison with stained slides, analysis under specific imaging techniques that do not require staining, or subsequent staining with different agents. For example, without limitation, stained input slide 116 may contain a liver tissue sample stained with Hematoxylin and Eosin (H & E) to highlight cellular structures, unstained slide 136 of the same liver tissue may be used for comparison or for staining with a specific marker that highlights fibrotic areas in liver disease studies. As used in this disclosure, an "orientation" is a spatial alignment of the slide or the tissue sample on the slide, including its position and angle relative to a standard reference point or axis. For example, without limitation, determine the correct orientation as a function of aligning the top edge of the tissue sample with a marked lined on the microscope platform to register segmented ROI from stained slide on to the unstained slide. Registering segmented region of interest 132 onto unstained slide 136 includes recording the orientation of unstained slide 136 relative to a reference plane 140 and registering segmented region of interest 132 to unstained slide 136. A "reference plane" is a two-dimensional surface establishing a standard orientation and position for sample being analyzed. In microscopy and image analysis, the reference plane may be determined by platform 120 as function of the digital grid within imaging software or a designated axis within the tissue sample. Reference plane 140 may be configured to facilitate accurate comparisons across different samples or imaging conditions as a function of all measurements and alignments. In a non-limiting example, in the registration of segmented regions of interest between stained and unstained slides, reference plane may be the physical surface of the microscope stage, marked with grids or axes. Platform 120 may be configured to record the rotation and position as a function of grids and axes with unstained slide 136 being plated on the platform. Segmented ROP 116 may be configured to project and map onto the unstained slide. For example, reference plane may be defined by the X and Y axes on the microscope stage, with a specific corner marked as the origin (0,0), the orientation of the unstained slide 136 may be recorded as being 15 degrees rotated clockwise from this origin. When registering the segmented ROI from the stained slide, adjustments may be made so that the ROI aligns correctly with the tissue's position on the unstained slide. In some embodiment, registering segmented region of interest 132 may include identifying, using a convolutional neural network, a projected region of interest on the unstained slide. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Still referring to FIG. 1, in some embodiments, apparatus 100 may further include a tissue extraction module configured to identify a tissue of interest within a registered region of interest on the unstained slide and extract the tissue of interest. As used in this disclosure, "tissue extraction," also referred to as tissue harvesting is the process of extracting tissue from the specimen. The extracted tissue may be used for a variety of purposes such as histological analysis and also downstream molecular analysis as and when indicated. Tissue extraction for molecular evaluation may involve extraction of a thick section of unstained tissue from a glass slide. One approach of tissue extraction is to extract all the tissue from across a slide. However, such approach is sub-optimal because the researchers may be interested in a specific type of tissue (e.g., tumor tissue) concentrated in one or more regions on the slide, and the tissue harvested through this approach may be diluted by the presence of other tissue present on the slide. The low concentration of tissue may hinder the detection and analysis of diseases during the molecular analysis. Alternatively, in order to increase the harvest density of tissue of interest, the regions of interest may be identified manually, followed by physical extraction of those regions from the glass slide. But such approaches may present a bottleneck that limits the scaling of the tissue extraction process. For example, manual intervention may limit one or both concentrations of the extracted tissue and the throughput of the extraction process. Tissue concentration may be limited by how accurately the physician or technician may extract tissue from the regions of interest. Meanwhile, throughput may be limited by factors such as how quickly the physician or technician can identify and extract the tissue, the setup, take down, and rest intervals between samples, and the availability of qualified individuals. Thus, scaling such a tissue extraction process—e.g., harvesting tissue with high-concentration of tissue, cells of interest with high-throughput may be challenging. Tissue extraction modules may combine or operate with high-resolution imaging systems with precise mechanical or laser cutting tools such as laser capture microdissection systems, ultramicrotomes, vibratomes, or automated tissue choppers to operate under the control of software algorithms that guide the extraction process based on identified regions of interest. As used in this disclosure, a "tissue of interest" are specific cells or tissue regions that are targeted for extraction and analysis. Tissue of interest may be suspected of exhibiting pathological changes, unique characteristics, or because they are relevant to the research. Tissues of interest vary widely across medical research, diagnostics, and therapeutic applications, for example, without limitation, tissue of interest may include cancerous tissue (e.g., breast tumor tissue, melanoma sections, etc.), neurological tissue (e.g., brain neurons in Alzheimer's disease, Parkinson's disease substantia nigra, etc.), cardiovascular tissue (e.g., atherosclerotic plaques, myocardial infarction areas, etc.), developmental and stem cell research tissue (e.g., embryonic stem cells, organoids, etc.). A "registered region of interest," as used in this disclosure, is an area on an unstained slide that has been digitally mapped and aligned with corresponding regions on a stained slide or another reference. As used in this disclosure, an "extraction location" is the area on the unstained slide from which the tissue of interest will be extracted. Extraction location may be determined based on the registration of the region of interest and encompasses the specific coordinates and boundaries of the tissue of interest. In a non-limiting example, tissue extraction module may be configured to use high-resolution imaging to identify the neurons of interest within the registered region of interest on an unstained slide, for example, a specific part of the hippocampus. The neurons of interest may be identified on a stained slide, and the location and shape may be digitally mapped onto the unstained slide. Tissue extraction module may be configured to analyze the unstained slide imagery data using machine learning algorithms to recognize the shape and location of the hippocampal neurons based on the input registration data. Tissue extraction module may be configured to active cutting tools to excise the neurons from the extraction location.

With continued reference to FIG. 1, apparatus 100 may further include platform 120 configured to receive and hold the unstained slide. As used in this disclosure, "platform" is a support structure configured to accommodate and position stained input slides for analysis. In some embodiment, platform 120 may be configured to hold slides, and integrate system components to facilitate various operational phases, such as, without limitation, slide identification, alignment, imaging, and tissue extraction. In some embodiments, platform 120 may also include a slide preparation platform. In some embodiments, platform 120 may be configured to support a plurality of slide dimensions and thicknesses in both standard laboratory slides as well as specialized slide formats. In a non-limiting example, platform 120 may include features such as adjustable support, clamps, or magnetic holders to secure the slides in place, preventing movement during the processing step. In an additional embodiment, platform 120 may be configured to interact with other apparatus 100 components, such as the imaging module and the tissue extraction mechanism. For example, platform 120 may be equipped with sensors that may detect the presence of a slide, and notify apparatus to initiate the slide acceptance process Processor in response to signals from these sensors, may activate the slide positioning mechanism. In some embodiments, the slide positioning mechanism may include adjustable components that gently secure the slide in place. In some embodiments, the slide positioning mechanism may adjust the slide's orientation, height, and lateral position automatically, based on preconfigured parameters stored within memory or manually input by the operator. The process of receiving stained input slide 116 may involve a verification step, wherein the apparatus may confirm that the slide is correctly positioned and ready for analysis. The verification step may include a preliminary scan or image capture by an imaging module to verify the slide's orientation and ensure that the entire area of interest is within the field of view.

With continued reference to FIG. 1, in some embodiments, at least a processor 108 may be configured to classify segments within the segmentation map by using a classification model. As used in this disclosure, a "classification model" is a machine learning algorithm configured to predefine rules to categorize or assign labels to input data. Classification model may be configured to identify segments in segmentation map and determine the type of object and region each segment represents (e.g., categories, labels, or the like). As a non-limiting example, the type of object and region each segment represents may include "dead cells," "healthy cells," "region of interest," or the like. In some embodiments, classification model may identify a plurality of tissue density criteria by analyzing an annotated tissue image dataset, wherein the analysis may include machine learning algorithms configured to recognize variations in tissue density as a function of pixel intensity and color heterogeneity across different tissue types. As used in this disclosure, a plurality of "tissue density criteria" is are predefined standards or measures used to differentiate between various tissue types based on density. In histopathology and medical imaging, tissue density may be related to how closely packed the cells are within a tissue section, which can affect how the tissue interacts with light or other imaging modalities. As used in this disclosure, an "annotation" is a piece of information or a description that is added as a note to another piece of information. In a non-limiting example, annotating tissue image may include marking out regions of interest, labeling different tissue types, or indicating areas of pathology. As used in this disclosure, "pixel intensity" is the brightness or darkness of a pixel in a digital image. Pixel intensity may be quantified as a value within a given range. For example, without limitation, pixel intensity values may range from 0 (black) to 255 (white) for 8-bit images in a grayscale images. As used in this disclosure, "color heterogeneity" is the variation in color within an image, reflecting the diversity of elements present in the sample. For example, without limitation, color heterogeneity may arise from the presence of different cell types, structures, or staining reactions in tissue samples. For instance, a highly heterogeneous tissue sample may contain areas of dense cellular proliferation with intense staining alongside less dense connective tissues that appear lighter.

With continued reference to FIG. 1, in some embodiments, processor 108 may be configured to generate classification training data. In a non-limiting example, classification training data may include correlations between exemplary segments and exemplary categories or exemplary labels. For example, and without limitation, classification training data may include correlations between segments in segmentation map and a "dead cells" category. In some embodiments, classification training data may be stored in database. In some embodiments, classification training data may be received from one or more users, database, external computing devices, and/or previous iterations of processing. As a non-limiting example, classification training data may include instructions from a user, who may be an expert user, a past user in embodiments disclosed herein, or the like, which may be stored in memory and/or stored in database, where the instructions may include labeling of training examples. In some embodiments, classification training data may be updated iteratively on a feedback loop. As a non-limiting example, processor 108 may update classification training data iteratively through a feedback loop as a function of segments, region of interests, or the like. In some embodiments, processor 108 may be configured to generate classification model. In a non-limiting example, generating classification model may include training, retraining, or fine-tuning classification model using classification training data or updated classification training data. In some embodiments, processor 108 may be configured to determine categories or label for segments using classification model (i.e. trained or updated classification model). In some embodiments, stained input slide 116, region of interest 124, segmented region of interests 132, segments, or the like may be classified to a tissue cohort or user cohort using a cohort classifier. Cohort classifier may be consistent with any classifier discussed in this disclosure. Cohort classifier may be trained on cohort training data, wherein the cohort training data may include data related to patients or tissue correlated to user cohorts or tissue cohorts. In a non-limiting example, a human or patient related to stained input slide 116 may be classified to a user cohort and processor 108 may determine category or label of segments based on the user cohort using a machine-learning module as described in detail with respect to FIG. 3 and the resulting output may be used to update classification training data. In another non-limiting example, a tissue or disease related to stained input slide 116 may be classified to a tissue cohort and processor 108 may determine category or label of segments based on the tissue cohort using a machine-learning module as described in detail with respect to FIG. 3 and the resulting output may be used to update classification training data. In some embodiments, generating training data and training machine-learning models may be simultaneous.

With continued reference to FIG. 1, in some embodiments, classification model may be configured to identify a target area for tissue extraction by applying a feature extraction algorithm configured to evaluate the segmented regions against the identified tissue density criteria, prioritizing areas that matches predefined criteria for tissue extraction. In a non-limiting example, prioritizing areas that matches predefined criteria may include determining an area that matches the identified tissue density criteria for tissue extraction and the determined area may be the target area. As used in this disclosure, a "target area" is a region within a tissue sample that contains characteristics that is of particular interest for examination, analysis, or intervention. Target area may be identified for extraction based on its relevance to the research. Target area may be selected to provide experimental image data, such as a disease state, cellular composition, or other biological phenomena. Target area may be configured to define the difference in surrounding tissue based on spatial coordinates within the sample and may be characterized by histological and molecular feature data. In a non-limiting example, target area may be a section of tissue with a high concentration of tumor cells with distinct morphological characteristics, such as increased nuclear size or irregular cell shapes.

With continued reference to FIG. 1, as used in this disclosure, a "feature extraction algorithm" is a computational technique configured to identify and quantify specific characteristics (features) of data that are relevant for differentiating between various classes or conditions within the dataset. Feature extraction algorithms may analyze the input data (such as images of tissue samples) to reduce its dimensionality to a set of features. Segmenting regions of a tissue sample based on density, in a non-limiting example, feature extraction algorithm may analyze pixel intensity values to distinguish between densely packed tumor cells and the surrounding less dense stromal tissue. Feature extraction algorithm may be configured to use edge detection to outline the boundaries of the tumor or textural analysis to characterize the chaotic pattern of tumor tissue versus the more ordered arrangement of healthy tissue. In some embodiments, tissue extraction may be configured to extract tissue from the slide on platform 120, and the tissue extracted may be used for further molecular analysis. The extraction platform may include a stage and an extraction instrument, one or both of which may be movable (e.g., coupled to a robotic actuator). The unstained slides may be fixed on the stage to a certain angle relative to a reference plane. The platform may extract tissue according to a predefined pattern by moving the stage and/or the extraction instrument relative to one another such that the portion of tissue that is extracted corresponds to the predefined pattern. In some embodiments, tissue extraction platform may extract tissue in an autonomous or semi-autonomous manner, e.g., without real-time intervention by a physician or other operator.

With continued reference to FIG. 1, in an additional embodiment, classification model may discard regions of low confidence level in the tissue, wherein the confidence level may be configured to be assessed to fall below a predetermined threshold specific to unstained tissue characteristics. As used in this disclosure, a "confidence level" is a quantitative measure or score reflecting the algorithm's certainty in its classification or identification decisions regarding tissue regions. Confidence level may be determined as a function of the underlying computational model's assessment of whether the feature and pattern observed in a region match the criteria. For example, high confidence level may indicate a set match to the criteria by suggesting significant interest. Conversely, a low confidence level may signal a weak match implying uncertainty or irrelevance of the region. In an example, without limitation, a high confidence level may be assigned to regions where the model detects a clear pattern of tumor-specific markers or morphological features. A low confidence level may be associated with ambiguous regions where the markers are not clearly present or where the tissue exhibits characteristics that are borderline between tumor and non-tumor.

With continued reference to FIG. 1, as used in this disclosure, a "threshold" is a predefined value used for decision-making in the classification process. The threshold may determine the minimum confidence level required for a tissue region to be considered relevant and retained for further analysis. Regions with confidence levels falling below the threshold may be deemed unreliable or of insufficient interest and may be discarded. Threshold may be adjusted based on the unstained tissue characteristics and the objectives of the analysis. In a non-limiting example, the objective may be configured to extract only highly characteristic tumor regions for genomic analysis, and a high threshold might be set. Thresholds with a confidence level of 90% or higher may be retained, discard all others as having too low a confidence level.

Still referring to FIG. 1, apparatus 100 may further include accessing a computer vision model configured to train segment a slide into distinct regions as a function of predefined criteria. As used in this disclosure, a "computer vision model" is a computational algorithm configured to interpret digital images or sequences of images. Computer vision model may be trained to make predictions based on input data. Computer vision model may include a configuration, which defines a plurality of layers of computer vision model and the relationships among the layers. Illustrative examples of layers may include input layers, output layers, convolutional layers, densely connected layers, merge layers, and the like. In some embodiments, computer vision model may be configured as a deep neural network with at least one hidden layer between the input and output layers. Connections between layers can include feed-forward connections or recurrent connections. One or more layers of computer vision model may be associated with trained model parameters. The trained model parameters are a set of parameters (e.g., weight and bias parameters of artificial neurons) that are learned according to a machine learning process. In some embodiments, the computer vision model may be the supervised vision model or self-supervised vision model. During the machine learning process, labeled training data is provided as an input to computer vision model, and the values of trained model parameters are iteratively adjusted until the predictions generated by computer vision model to match the corresponding labels with a desired level of accuracy.

Still referring to FIG. 1, in some embodiments, apparatus 100 may include a machine vision system that includes at least a camera. A machine vision system may use images (e.g., digital images of stained input slide 116, or the like) from at least a camera, to make a determination about a scene, space, and/or object (e.g., region of interest 124, or the like). In some cases, a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however.

With continued reference to FIG. 1, a third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, in some embodiments, apparatus 100 may be further configured to calculate an overlap metric for the stained and the unstained slide, wherein the overlap matric quantifies the extent of alignment between the region of interest on the slide and a corresponding area on a target surface. As used in this disclosure, an "overlap metric" is a quantitative measure that evaluates the degree of spatial alignment or correspondence between a region of interest 124 identified on one slide (e.g., a stained input slide) and a similar or corresponding area identified or projected onto another slide or surface (e.g., an unstained slide). Overlap metric may be configured to compare the features, shapes, and positions of the ROIs across the slides by using calculated computer vision and image processing techniques. Overlap metrics may range from values indicating no overlap (poor alignment) to perfect overlap (ideal alignment). For example, without limitation, a tumor region may be identified on a stained input slide, and overlap matric may be identified by aligning the tumor region with the corresponding tissue area on an unstained slide as a function of image registration algorithms to calculate overlap metric. As used in this disclosure, a "target surface" is a plane or medium onto which an image, pattern, or specific area of interest from a source slide is projected or aligned for comparison, analysis, or further processing. The target surface could refer to the digital or physical plane of an unstained slide where the region of interest 124 from stained input slide 116 may be mapped or registered. For example, without limitation, gene expression in a specific area of tissue under different conditions may be compared, stained input slide may present the area of interest with specific staining and the unstained slide may be used for in situ hybridization to detect gene expression. The unstained slide as a target surface to which the region of interest from stained input slide may be similar compared to the gene expression analysis and the same tissue region identified by the staining. In another embodiment, apparatus 100 may be further configured to select an optimal orientation. For the purposes of this disclosure, an "optimal orientation" is the orientation that maximizes the overlap metric. Apparatus 100 may generate digital images of both the stained and unstained slides using the computer vision model. The computer vision model may be configured to identify and map ROI on the stained input slide then project mapped ROI onto the digital image of the unstained slide. The orientation of the unstained slide image may be adjusted in multiple axes, for example, in two-dimensional space (X and Y axes) but potentially in three dimensions (including rotation or tilt) for more complex analyses. Apparatus 100 may be configured to calculate the overlap metric for each possible orientation of the unstained slide image, comparing the projected ROI to the corresponding area on the unstained slide by using image analysis algorithms. The apparatus may take an image of a stained input slide with a clearly marked tumor region and attempt to overlay the image onto an unstained slide containing the same tumor tissue but without the staining. Apparatus may be configured to calculate the overlap metric for each adjustment by adjusting the orientation of the unstained slide image, such as rotation, shifting, and tilting. In other embodiments, apparatus 100 may be further configured to adjust the slide position as a function of the selected orientation to the maximum overlap of the region of interest. Computer vision system may be configured to identify the optimal orientation for aligning ROI on a source slide (e.g., stained) with a target area on a destination slide (e.g., unstained) as previously determined by calculating the overlap metric. Computer vision system may be further configured to communicate the required orientation adjustments to the mechanical components responsible for slide positioning. Mechanical components may include, but not limited to motorized stages or robotic arms, then computer vision system may be further configured to rotate, tilt, or shift the slide into the exact orientation of alignment as indicated by the overlap metric. For example, without limitation, apparatus 100 may be configured to align a section of brain tissue stained for a specific marker with an unstained section prepared for microscopic examination. Apparatus 100 may digitally overlay the stained section's image onto the unstained section's image, identifying an orientation that maximizes the overlap of a specific ROI, perhaps a region showing potential signs of neurodegeneration. Apparatus 100 then physically adjusts the unstained slide's position on the microscope stage, rotating it slightly and shifting it to align precisely with the stained slide's ROI.

Figure 2:
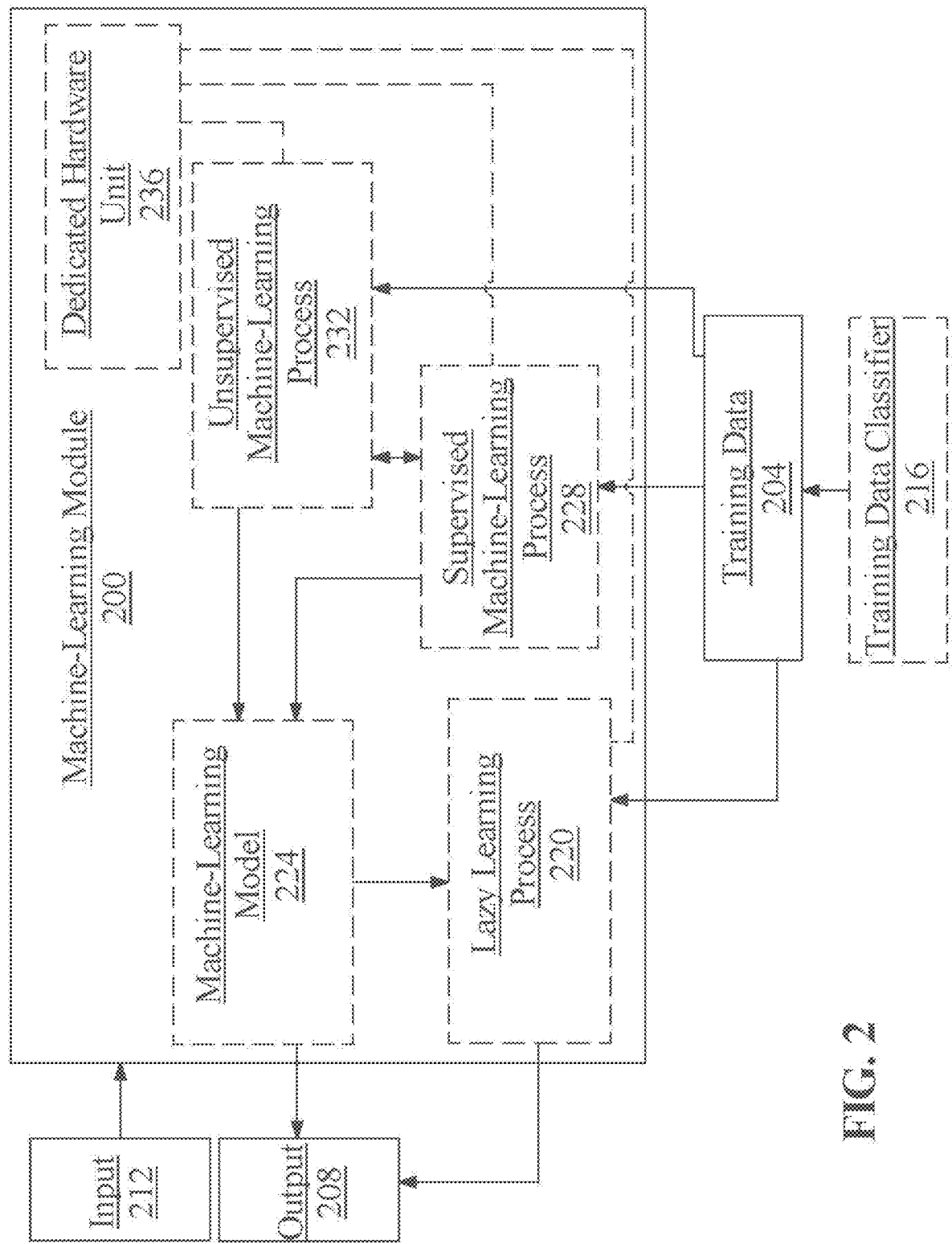
FIG. 2 illustrates a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, input data may include high-resolution digital images of stained and unstained tissue slides, annotated by researchers to indicate regions of interest (ROIs) such as specific tissue types, pathological lesions, or cellular markers. The annotations may include details such as the type of tissue, the presence of disease markers, or the density of specific cell types. The output data generated by the machine-learning module, based on the analysis of this input data, may be segmentation maps highlighting the identified ROIs on new, unstained slides; quantification metrics such as the area, density, or volume of the ROIs; and classification labels indicating the type of tissue or the presence of specific pathological conditions within the segmented region.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to identify specific patterns of gene expression within a cohort of cancer patients versus a control group without cancer. Classification may be based on analyzing microarray or sequencing data contained within the training data, where each element represents a sample's gene expression profile. By doing so, classifier may differentiate between the gene expression signatures characteristic of cancerous tissues and those of normal tissues, enabling the selection of a subset of training data that specifically relates to oncological studies.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values.

Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as eosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete eosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or Feature scaling may include mean normalization, which subset $$X_{max}: X_{new} = \frac{X - X_{min}}{X_{max} - X_{min}}.$$

Feature scaling may include standardization, where involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input as described above as inputs, output described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
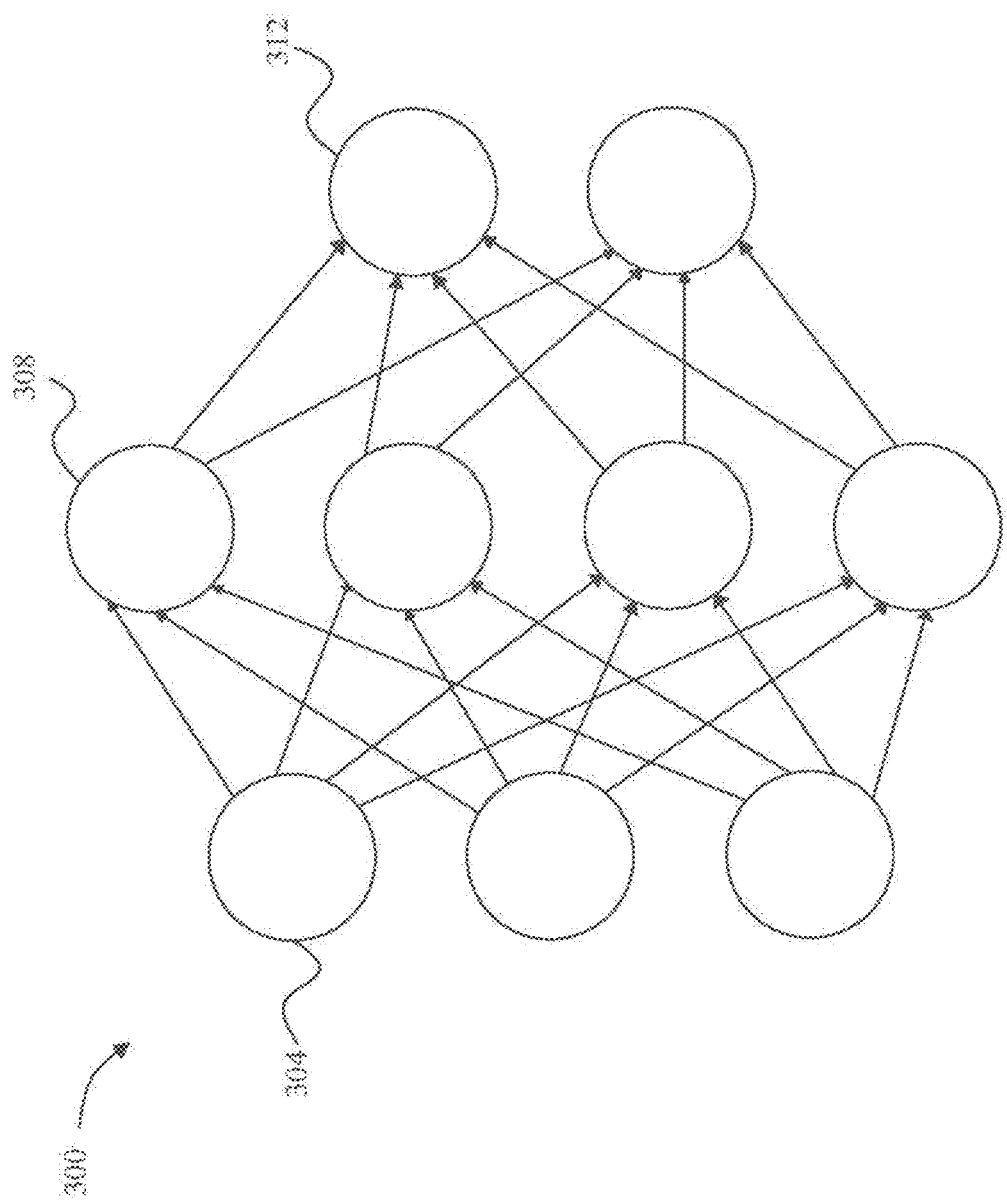
FIG. 3 illustrates a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
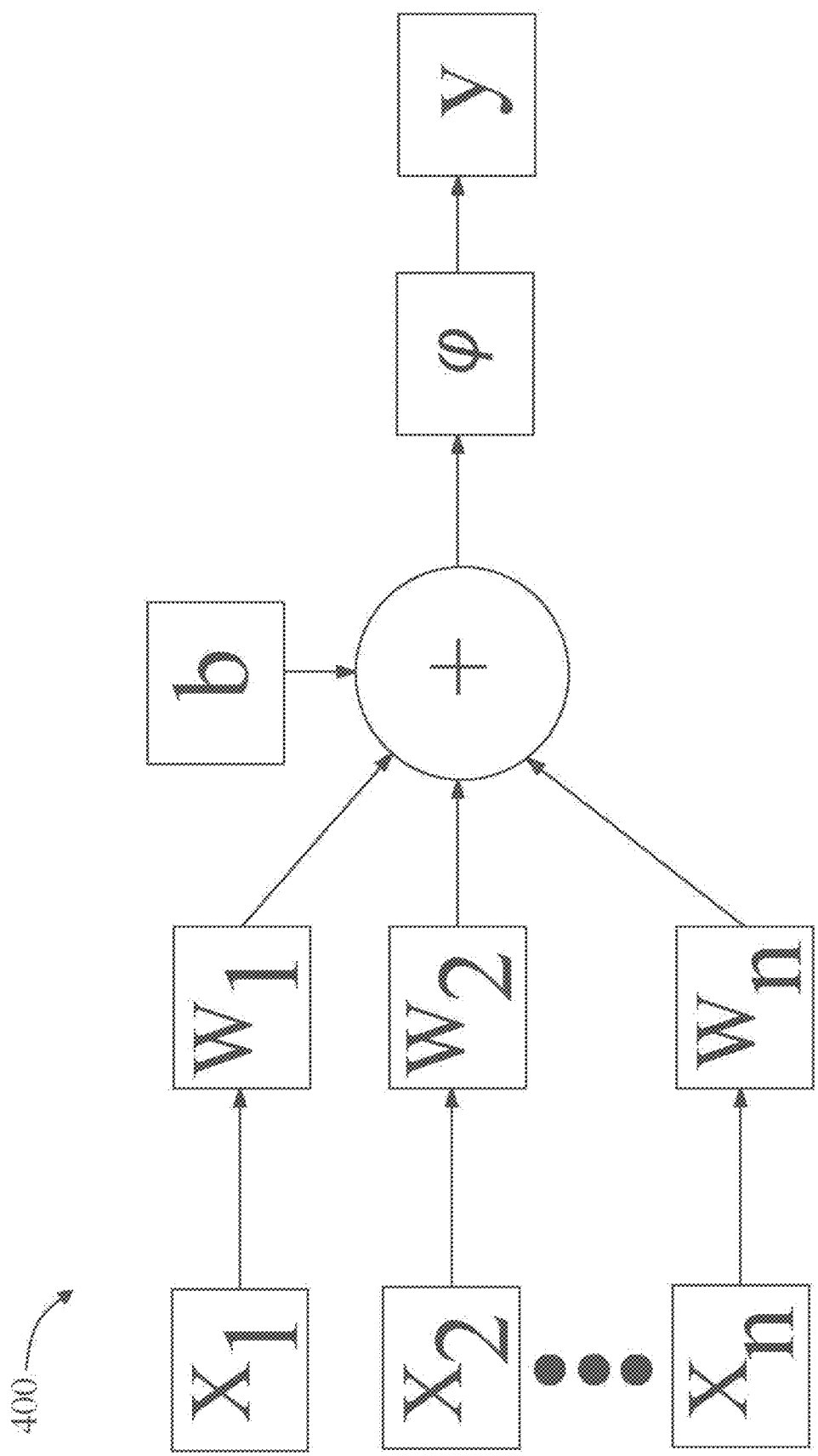
FIG. 4 illustrates a diagram of an exemplary embodiment of a node of a neural network.

Referring now to FIG. 4, an exemplary embodiment of a node 400 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
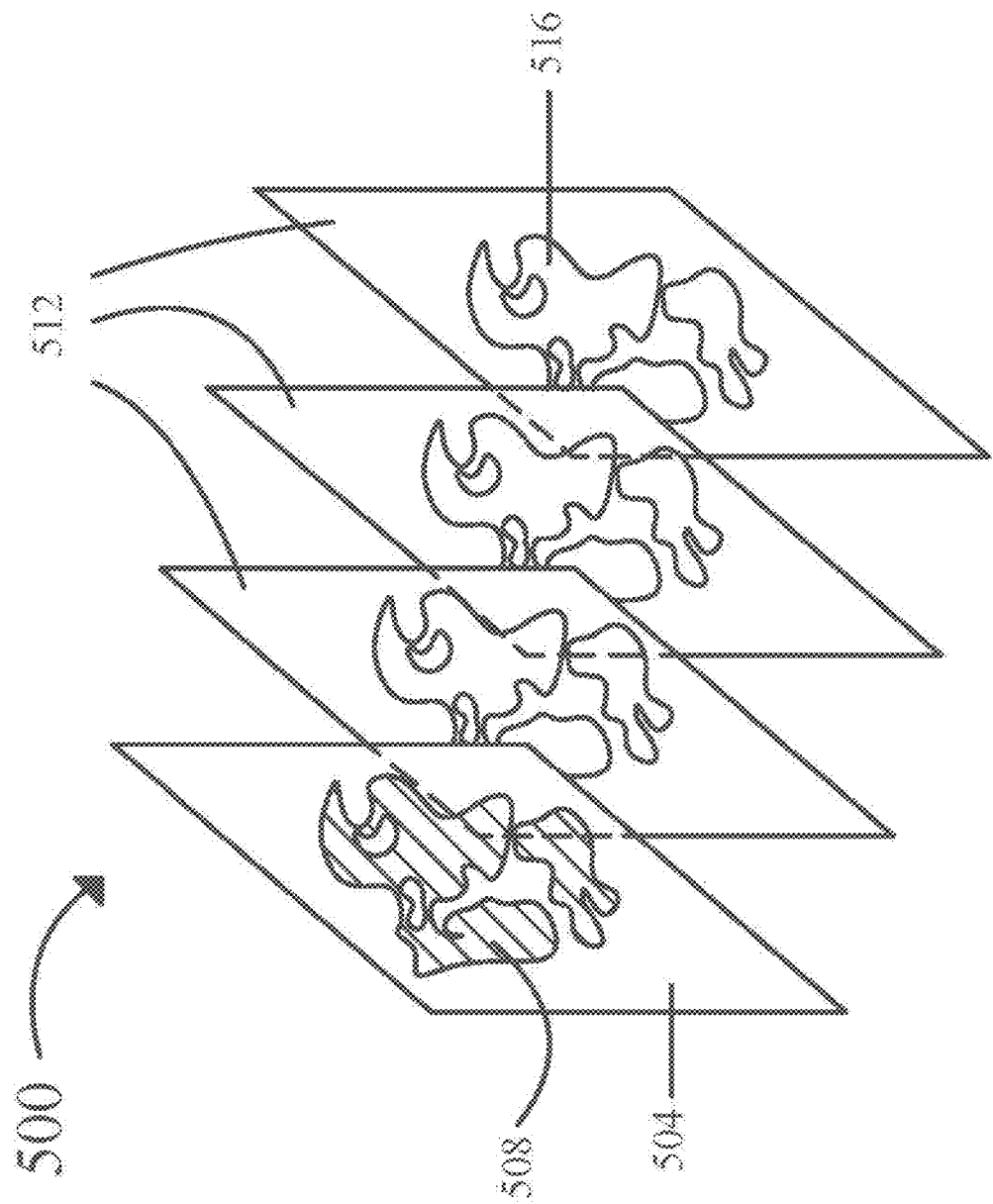
FIG. 5 illustrates an H & E-stained slide and unstained slides from the same slide group.

Referring now to FIG. 5, a slide group containing a hematoxylin and eosin staining (H & E) slide 504 with stained sample 508 and unstained slides 512 containing contiguous slices of specimen samples drawn from a subject is illustrated. The automated approach described above may address the following challenges of selective harvesting of regions of interest from unstained slides 512. The unstained slides 512 may contain contiguous unstained sample 516 slices mounting on the slides would have variations requiring the transformation of the unstained slide as described above. Apparatus 100 may increase the harvest density of regions of interest, allowing for separate harvesting of regions of interest aided by the granularity and precision of the extraction process even if only at a macro-dissection level. Apparatus 100 may eliminate human involvement allowing the process to scale.

Figure 6:
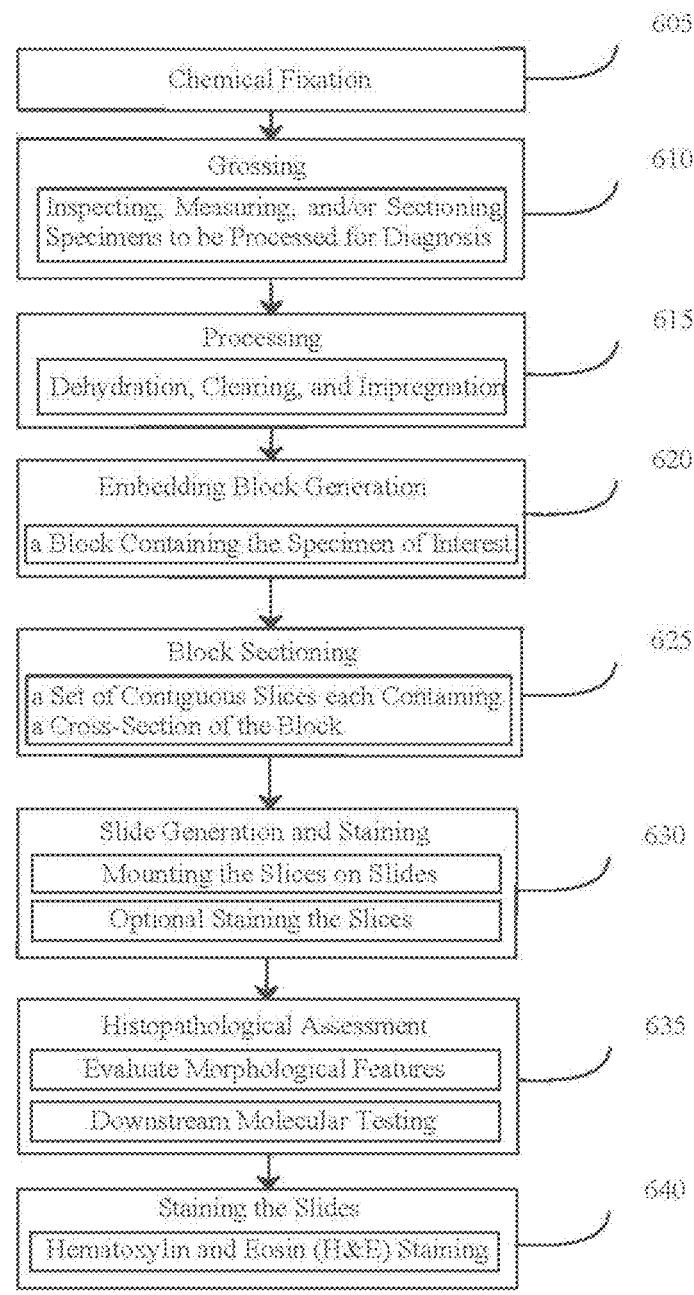
FIG. 6 illustrates a flow diagram illustrating an exemplary workflow of a method for preparing slides for histopathological assessment.

Referring now to FIG. 6, a flow diagram illustrating an exemplary workflow of a method for preparing slides for histopathological assessment. For example, preparation of a slide group may include the steps of chemical fixation 605, grossing 610, which may include inspecting, measuring, and/or sectioning specimens to be processed for diagnosis; further processing 615 including dehydration, clearing, and impregnation; embedding block generation 620, which yields a block (e.g., a paraffin block) containing the specimen of interest; block sectioning 625, which yields a set of contiguous slices each containing a cross-section of the block; and slide generation and staining 630, which includes mounting the slices on slides and optionally staining the slices. In this manner, the plurality of slices from the same block/slide group may have similar cross-sections due to their proximity to each other in the block. Histopathological assessment 630 may then be carried out on the slides to evaluate morphological features and then as per disease pathology indication further downstream molecular testing can be done after tissue extraction from the slides to get the enriched nuclear acid content from the desired tissue of interest.

With continued reference to FIG. 6, staining slides at steps 630 and 640 may include hematoxylin and eosin (H & E) staining. H & E staining facilitates histological analysis by identifying different types of tissues, their patterns, shapes and structures on the slides. The remaining unstained slides may also be used for downstream molecular testing post nucleic acid extraction from the desired tissue extracted from slides. For example, one or more regions on the unstained slide may be harvested for further analysis at a more granular level for nucleic acid extraction to perform molecular testing.

Figure 7:
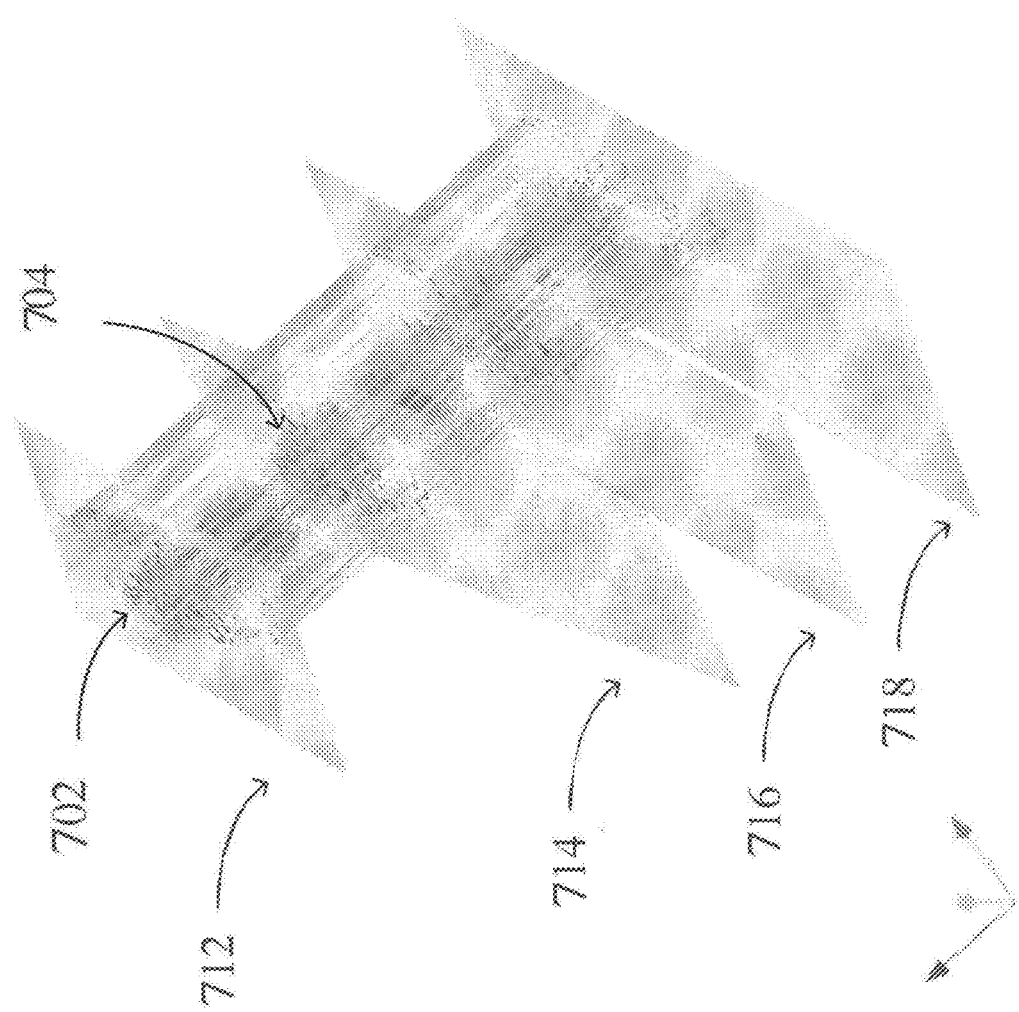
FIG. 7 illustrates a diagram illustrating a simplified diagram illustrating the orientation of a plurality of digital slide relative to a stained reference slide.

Referring now to FIG. 7, FIG. 7 illustrates a diagram illustrating the orienting of a plurality of slides 714-718 relative to a reference slide 712, in accordance with certain embodiments of the present disclosure. According to some embodiments consistent with FIG. 1, the slides 712-718 may generally correspond to stain input slide 108. For example, the reference slide 712 and the plurality of slides 714-718 may be from the same slide group, and the slide group may include contiguous slices carrying tissue specimen drawn from a paraffin tissue block. In some embodiments, the reference slide 712 may correspond to stained slide (e.g., with H & E staining), and the plurality of slide 714-718 may correspond to unstained slides. One or more regions of interest 702 may be identified on the reference slide 712. The one or more regions of interest 702 may reflect certain diseases (e.g., tumor, cancer) that a researcher may be interested in. In some embodiments, the one or more regions of interest may be identified automatically. For example, a computer vision model, such as the computer vision model, may be used to segment the stained slide 712 to generate a segmentation map. The segmentation map may identify one or more segmented regions on the stained slide. In some embodiments, the one or more segmented regions may be further classified, and a segmented regions with a boundary certainty being less than a threshold will be discarded.

Still referring to FIG. 7, as discussed above with reference to FIG. 1, clinicians and/or researchers may be interested in extracting tissue from one or more regions on slides 714-718 that correspond to regions of interest 702 for further pathological analysis. To reduce human intervention, one way is to digitally project one or more regions of interest 702 of stained reference slide 712 onto unstained slides 714-718. However, due to variability in the slide preparation process, the tissue mounted on slides 714-718 may have variations (e.g., shape, cross section) relative to reference slide 712. For example, slices of tissue may not be sectioned contiguously from a paraffin block, which leads to wide variations in cross section when they are mounted on the slides. Using slices of tissue are sectioned near in sequence, especially when they are sectioned contiguously from the paraffin block, may reduce such variations, but some variability may remain. For example, when slices of tissue are mounted on the slides, they may be oriented to a certain degree on the slide due to various reasons such as surface tension of fluid, human error, etc. For example, as depicted in FIG. 7, the slide 712 and the slide 714 may share a similar cross section, but the tissue mounted on the slide 714 is oriented to a certain degree if the slide 712 is taken as reference. As such, the harvest density of interested tissue from the slide 714 may be reduced if the one or more regions of interest of the stained slide are projected directly onto the unstained slide.

With continued reference to FIG. 7, to address this variability, an orienting module, such as the orienting module may be used to orient the plurality of slides 714-718 to the reference slide 712. For example, the orienting module may apply one or more transformations (e.g., 2D or 3D rotations and/or translations) to the plurality of slides 714-718 to maximize an overlap between one or more features that are common between the plurality of slides 714-718 and reference slide 712. For example, the reference slide may correspond to a stained slide and the plurality of slides 714-718 may correspond to unstained slides. Accordingly, the features used to align the slides may include tissue boundaries, contours, and other features that are visible in an unstained slide (even when such features appear faint). For example, as shown in FIG. 7, the unstained slide 714 may be oriented in the 3D space relative to the reference slide 712 to maximize the overlapping area. Optionally, the processing pipeline may record an orientation of one of the plurality of slides 714-718 in the 3D space relative to a reference plane. Once slides 714-718 may be oriented relative to reference slide 214, the segmentation map and the one or more regions of interest 702 associated with reference slide 712 may be projected to the plurality of slides 714-718. In this manner, one or more projected regions of interest 704 that are likely to correspond to regions of interest 702 (e.g., portions that contain tissue to be extracted) are identified on the plurality of slide 714-718. A tissue harvesting platform (not shown in FIG. 2) may be used to harvest tissue from one or more unstained slides, such as the unstained slide 714. The tissue harvesting platform may be calibrated with the orientation of the unstained slide relative to the reference plane. The harvesting platform may harvest tissue from the one or more projected regions of interest 704. Specifically, the harvesting instrument of the harvesting platform may use the segmentation map to harvest tissue from the one or more projected regions of interest 704 of the unstained slide 714. Some or all steps may be repeated to process other unstained slides, such as the unstained slide 716 and the unstained slide 718, for automatic tissue extraction at scale. The overall process to be described in detail below may maximize harvesting tissue from regions of interest in the unstained slide while reducing human intervention.

Figure 8:
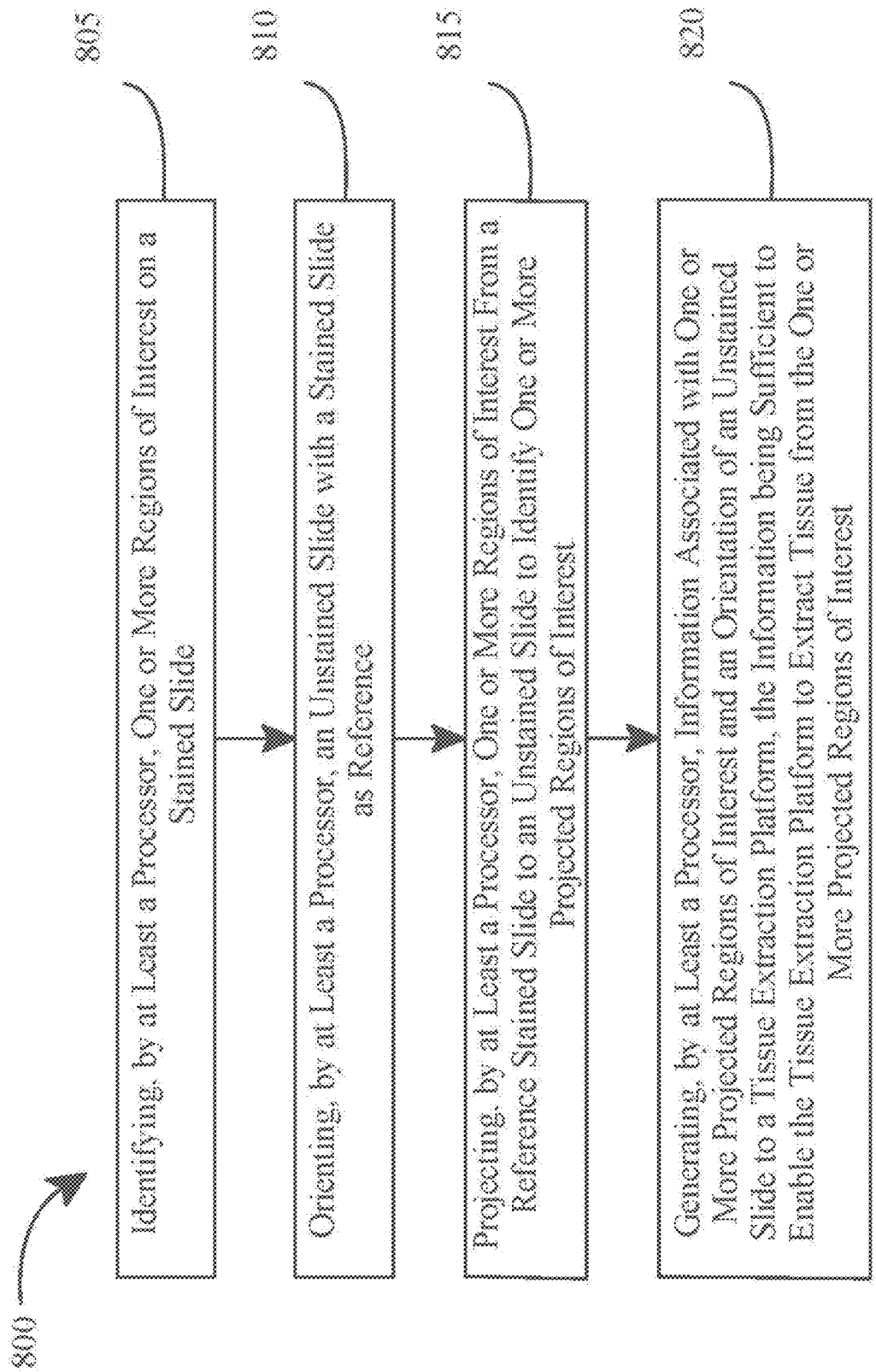
FIG. 8 illustrates a flow diagram illustrating a simplified diagram of a method for scalable microdissection of tissue from slide.

Referring now to FIG. 8, a flow diagram illustrating a simplified diagram of a method 800 for scalable microdissection of tissue from slide is illustrated. Method 800 includes step 805 of identifying, by at least a processor, one or more regions of interest on a stained slide. The stained slide may carry tissue for histological analysis and may be stained with any methods, e.g., stained by hematoxylin and eosin. The one or more regions of interest may be any regions on the stained slide which the researcher may be interested in. For example, the one or more regions of interest may be the regions which is likely to contain tumor and/or cancer tissue. In some embodiments, the stained slide may be in digital format (e.g., JPG, JPEG, PNG, BMP). Various preprocessing steps may be performed to transform the stained slide into digital format. For example, a scanner, such as the scanner 102, may be used to scan the stained slide into digital format, so that the stained slide is the digital representation (e.g., pixel data) of tissues on the slide. In some embodiments, the one or more regions of interest on the stained slide may be identified by an algorithm. For example, the one or more regions of interest may be identified as anomalous compared with other normal tissue on the slide by one or more parameters (e.g., color, brightness), hence anomalous region detection may be used. Illustrative embodiment of identifying the one or more regions of interest on the stained slide are described below with reference to FIG. 8. This may be implemented, without limitation, as described above with reference to FIGS. 1-7.

With continued reference to FIG. 8, method 800 includes a step 810 of orienting, by at least a processor, an unstained slide with a stained slide as reference. The orientation may be performed by an orienting module. The orienting may be in two or three dimensions and may involve applying 2D and/or 3D transformations to one or both of the unstained or stained slides, such as rotations, scale, skew, transform and the like. The orienting module may align one or more features that are common between the stained slide and the unstained slide, e.g., by maximizing the overlap between the common features in two or three dimensions. In general, the common features are those that are detectable (e.g., discernable using automated computer vision techniques) in both stained and unstained slides. Examples of common features may include contours, tissue boundaries, and the like, which may be visible without staining. In some embodiments, the unstained slide may be in digital format and the various preprocessing steps are similar to those described above. In some embodiments, the stained slide and the unstained slide are from the same slide group. This may be implemented, without limitation, as described above with reference to FIGS. 1-7.

With continued reference to FIG. 8, method 800 includes a step 815 of projecting, by at least a processor, one or more regions of interest identified in a stained reference slide may be projected onto an unstained slide to identify one or more projected regions of interest on the unstained slide. As described above, the region of interest may appear in similar locations on the unstained slide as the stained slide, especially when the stained slide and the unstained slide are contiguous from the same paraffin block. Hence one or more regions of interest of the unstained slide may be identified by projecting the one or more regions of interest of the stained slide onto the unstained slide. The one or more projected regions of interest may be used for tissue extraction to be described in detail below. This may be implemented, without limitation, as described above with reference to FIGS. 1-7.

With continued reference to FIG. 8, method 800 includes a step 820 of generating, by at least a processor, information associated with one or more projected regions of interest and an orientation of an unstained slide to a tissue extraction platform. The information is sufficient to enable the extraction platform to extract tissue from the one or more projected regions of interest on the unstained slide. For example, the information may include instructions and/or data that the tissue extraction platform uses to calibrate the stage and/or the extraction instrument. For example, the stage of the tissue extraction platform may be calibrated by the orientation of the unstained slide and the extraction instrument may be guided by the one or more projected regions of interest. The tissue extraction platform may extract tissue in an autonomous or semiautonomous manner, e.g., without real-time intervention by a physician or other operator. Meanwhile, the harvest density of interested tissue on unstained slide may be increased. It allows the harvesting of tissue aided by the granularity and precision of the one or more regions of interest even if only at a microdissection level. In some embodiments, the orientation of the unstained slide relative to a reference plane may be stored in a memory, such as the memory 160 (e.g., one or more non-transitory memories). In some embodiments, the orientation of the unstained slide is stored in a database. This may be implemented, without limitation, as described above with reference to FIGS. 1-7.

Figure 9:
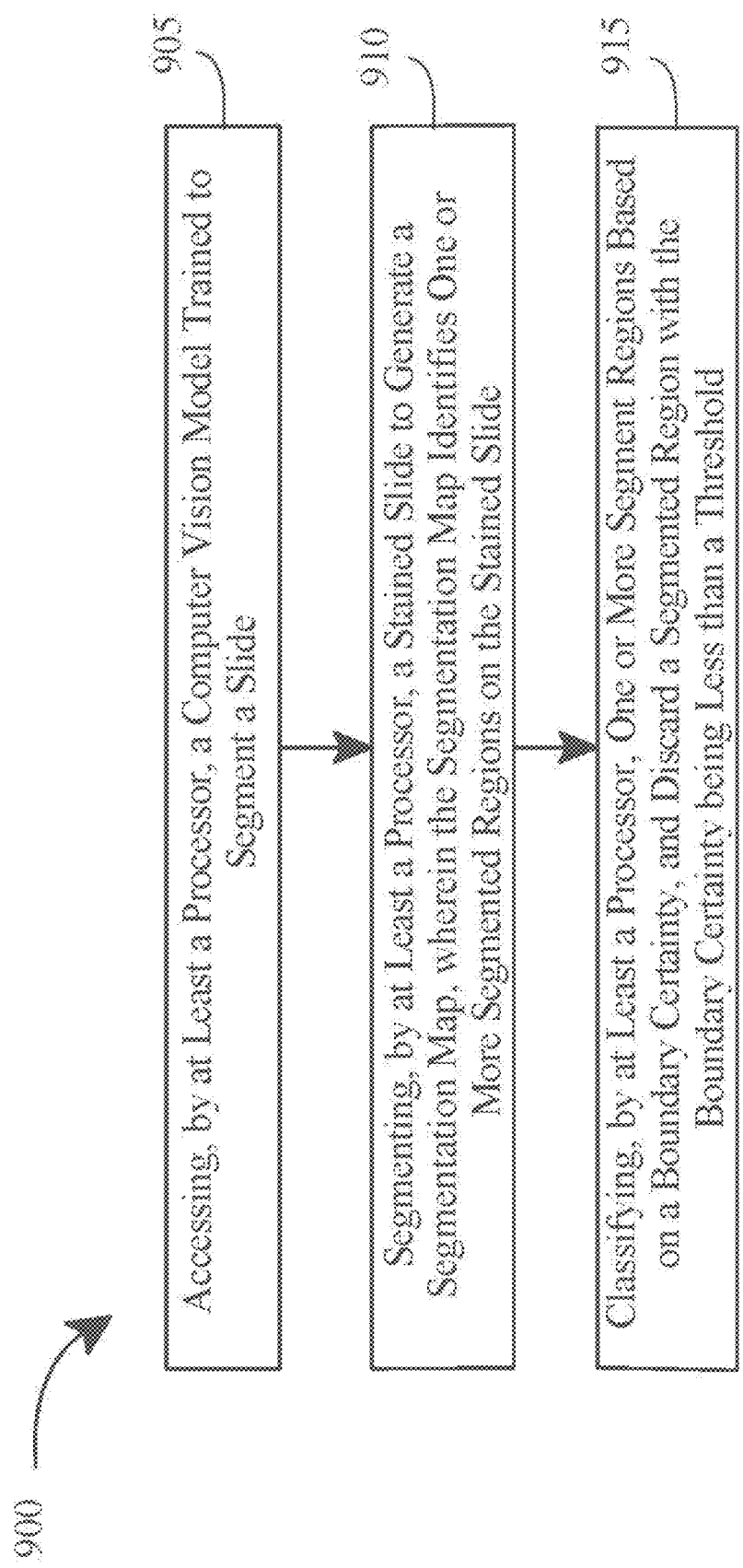
FIG. 9 illustrates a flow diagram illustrating a simplified diagram of a method for identifying one or more regions of interest on a stained slide.

Referring now to FIG. 9, a flow diagram illustrating a simplified diagram of a method for identifying one or more regions of interest on a stained slide is illustrated. Method 900 includes step 905 of accessing, by at least a processor, a computer vision model trained to segment a slide. In some embodiments, the slide may be stained slide. In some embodiments, the slide may be unstained slide. In computer vision, object detection or object recognition refers to detecting the existence of an object or multiple objects, their categories, and their locations. Segmentation may be used to identify the contour of an apple, a car, a person, or the specific histological pattern in the tissue biopsy slide etc. As one application of object detection technology, segmentation may be used to identify clusters of pixels on a slide that correspond to the same entity. Segmenting the stained slide may include figuring out the bounding path (e.g., contour) of one or more regions on the stained slide. Accordingly, the computer vision model may be trained to identify the bounding path of the one or more regions of the stained slide. An example of a computer vision model that can identify the bounding path of an object in this manner is the DINO model, which is described in Mathilde Caron et. al, Emerging Properties in Self-Supervised Vision Transformers, Computer Vision and Pattern Recognition, 2021, which is incorporated by reference herein in its entirety. The computer vision model may be a supervised vision model, self-supervised vision model, or any other suitable models those skilled in the art will appreciate. In some embodiments, the computer vision model may be a pre-trained computer vision model. In some embodiments, the computer vision model may be trained with a plurality of segmented slides. For example, the plurality of slides as the training data may be segmented by tissue. As the other example, the plurality of slides as the training data may be segmented by cell. This may be implemented, without limitation, as described above with reference to FIGS. 1-8.

With continued reference to FIG. 9, method 900 includes a step 910 of segmenting, by at least a processor, a stained slide to generate a segmentation map, wherein the segmentation map identifying one or more segmented regions on the stained slide. Specifically, the segmentation map may be generated by identifying one or more boundaries of one or more regions of the stained slide, and the segmentation map may include the one or more segmentation boundaries. Various pre-processing steps may be performed to prepare the stained slide for the computer vision model. These pre-processing steps can include cropping and/or padding the stained slide to fit a predetermined aspect ratio, scaling the dimensions of the stained slide to fit a predetermined size, or the like. This may be implemented, without limitation, as described above with reference to FIGS. 1-8.

With continued reference to FIG. 9, method 900 includes a step 915 of classifying, by at least a processor, one or more segmented regions based on a boundary certainty, and a segmented region with the boundary certainty being less than a threshold. The one or more segmented regions may be further pruned with low confidence in presence of tissue, interested tissue and/or tissue density. As such, the one or more segmented regions may be further narrowed down to reflect the one or more regions of interest on the stained slide. Other similar approaches may also be used to narrow down the one or more segmented regions. For example, pruning the one or more segmented regions that are signal deficient. As described above, doing so would further improve the harvest density of interested tissue from the one or more projected regions of interest on the unstained slide. This may be implemented, without limitation, as described above with reference to FIGS. 1-8.

Figure 10:
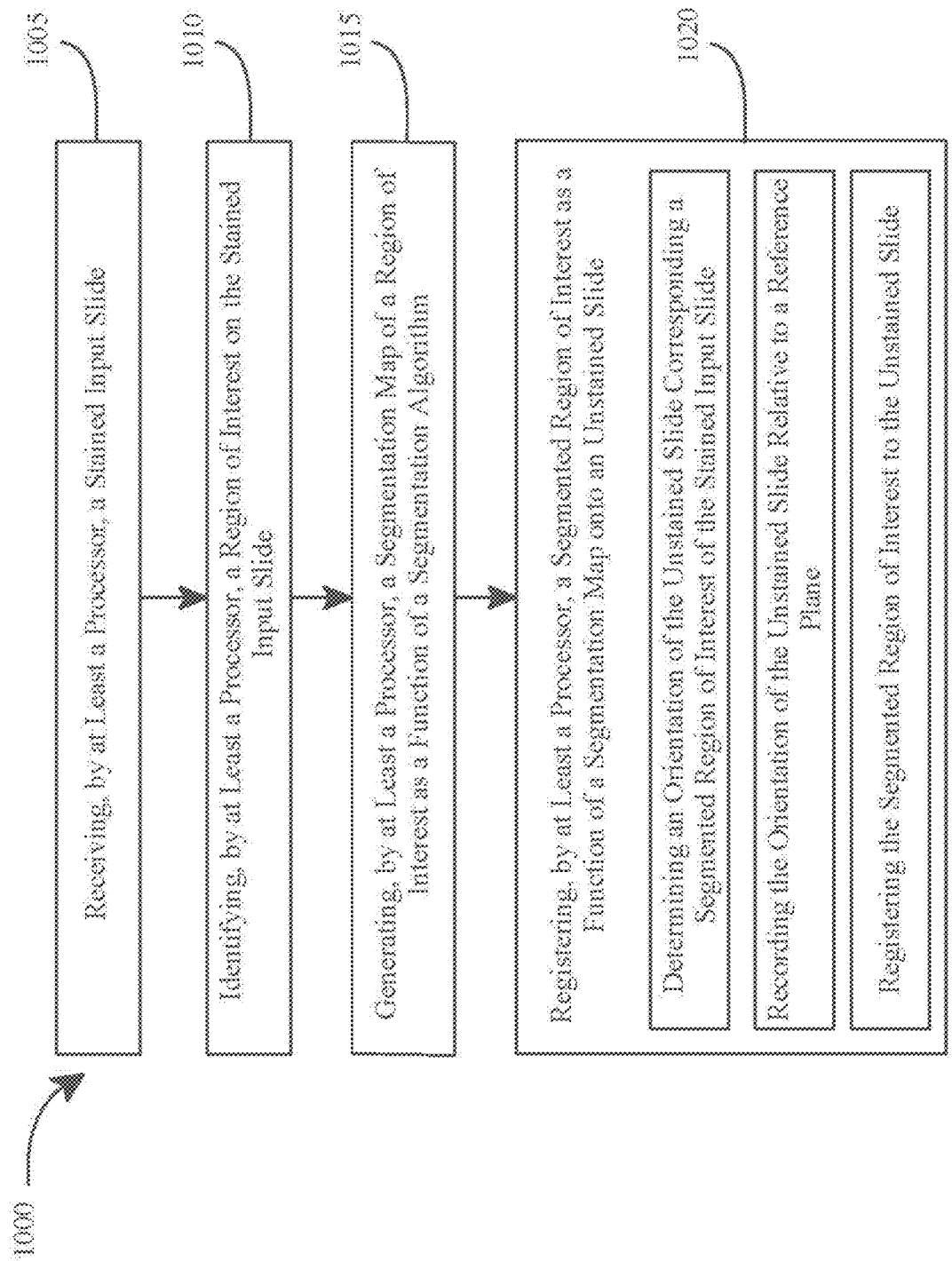
FIG. 10 illustrates a flow diagram illustrating an exemplary workflow of a method for automated microdissection of tissue from slides to optimize tissue harvest from regions of interest.

Referring now to FIG. 10, a flow diagram of an exemplary method 1000 for automated microdissection of tissue from slides to optimize tissue harvest from regions of interest is illustrated. Method 1000 includes step 1005 of receiving, by at least a processor, a stained input slide. This may be implemented, without limitation, as described above with reference to FIGS. 1-9.

With continued reference to FIG. 10, method 1000 includes a step 1010 of identifying, by at least a processor, a region of interest on a stained input slide. This may be implemented, without limitation, as described above with reference to FIGS. 1-9.

With continued reference to FIG. 10, method 1000 includes a step 1015 of generating, by at least a processor, a segmentation map of a region of interest as a function of a segmentation algorithm. This may be implemented, without limitation, as described above with reference to FIGS. 1-9.

With continued reference to FIG. 10, method 1000 includes a step 1020 of registering, by at least a processor, a segmented region of interest, as a function of a segmentation map onto an unstained slide. Step 1020 further includes determining an orientation of the unstained slide corresponding the segmented region of interest of a stained input slide, recording the orientation of the unstained slide relative to a reference plane, and registering the segmented region of interest to the unstained slide. This may be implemented, without limitation, as described above with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
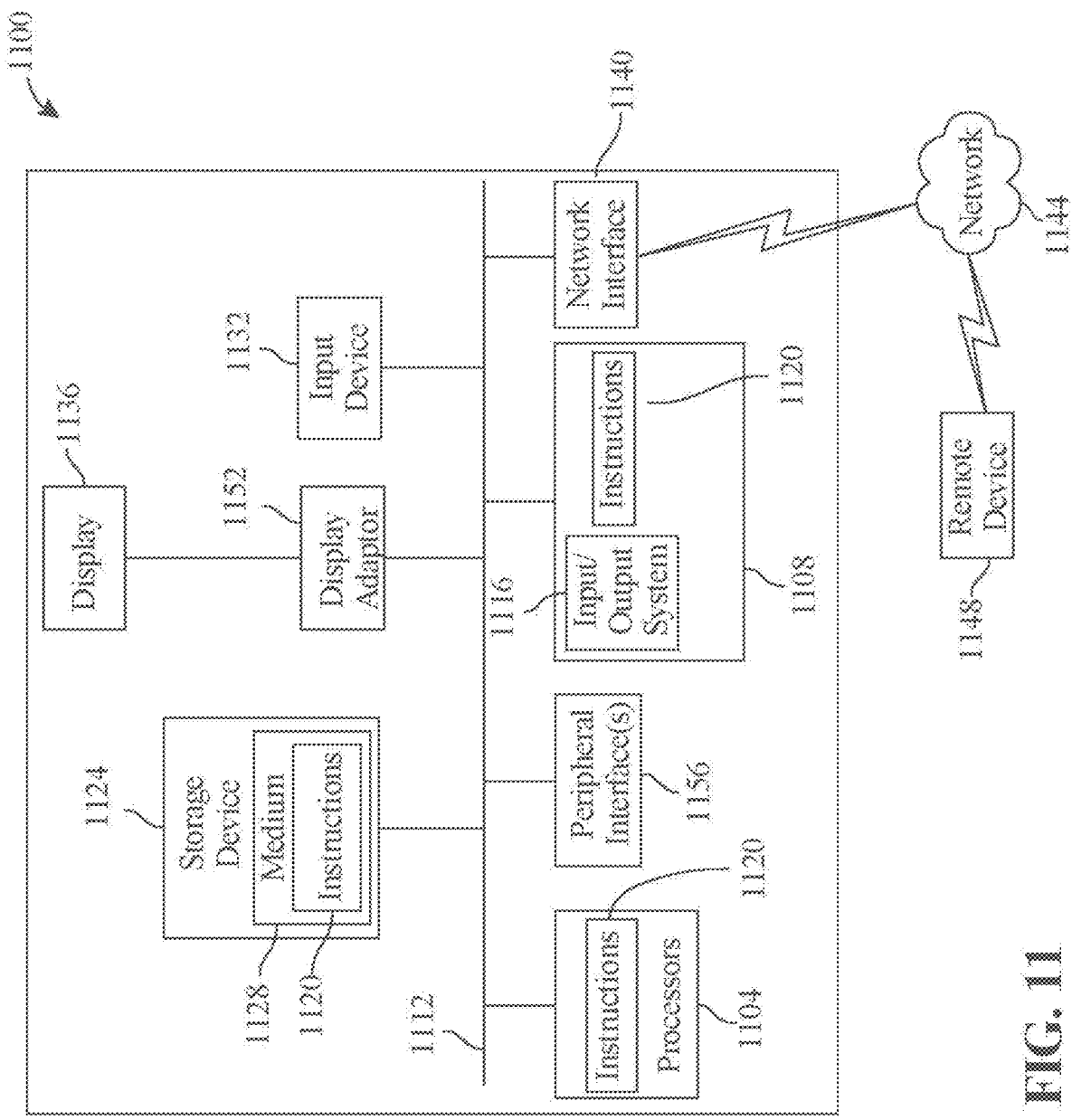
FIG. 11 illustrates a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated microdissection of tissue from slides to optimize tissue harvest from regions of interest, the apparatus comprising:
  at least a processor; and
  a memory communicatively connected to the at least a processor, wherein the memory contains instructions configuring the at least a processor to:
    receive a stained input slide;
    identify a region of interest on the stained input slide, wherein identifying the region of interest comprises using a registration module to:
      log a sample size from the stained input slide;
      document a plurality of slides sectioned for analysis;
      predict a size and a location of the region of interest as a function of the sample size and the number of slides; and
      register the identified region of interest across a plurality of unstained slides;
    generate a segmentation map of the region of interest as a function of a segmentation algorithm; and
    register a segmented region of interest, as a function of the segmentation map, onto an unstained slide, wherein registering the segmented region of interest onto the unstained slide comprises:
      determining an orientation of the unstained slide corresponding to the segmented region of interest of the stained input slide;
      recording the orientation of the unstained slide relative to a reference plane; and
      registering the segmented region of interest to the unstained slide.

2. The apparatus of claim 1, further comprising:
  a platform, wherein the platform is configured to receive and hold the unstained slide.

3. The apparatus of claim 1, further comprising:
  a tissue extraction module, wherein the tissue extraction module is configured to:
    identify a tissue of interest within the registered segmented region of interest on the unstained slide;
    analyze the tissue of interest to determine an extraction location; and
    extract the tissue of interest as a function of the extraction location.

4. The apparatus of claim 1, wherein identifying the region of interest on the stained input slide comprises extracting features and pattern characteristics of the region of interest using a supervised learning machine learning algorithm.

5. The apparatus of claim 1, wherein registering the segmented region of interest comprises identifying, using a convolutional neural network, a projected region of interest on the unstained slide.

6. The apparatus of claim 1, wherein the memory contains instructions further configuring the at least a processor to classify, using a classification model, segments within the segmentation map by:
  identifying a plurality of tissue density criteria by analyzing an annotated tissue image dataset, wherein the analysis comprises at least a machine learning algorithm configured to recognize variations in tissue density as a function of pixel intensity and color heterogeneity across different tissue types;
  identifying a target area for tissue extraction by applying a feature extraction algorithm, wherein the feature extraction algorithm is configured to evaluate the segmented regions against the identified tissue density criteria and determine an area that matches the identified tissue density criteria for tissue extraction; and
  discarding regions of low confidence level, wherein the low confidence level is a confidence level that falls below a predetermined threshold specific to unstained tissue characteristics.

7. The apparatus of claim 1, wherein the memory contains instructions further configuring the at least a processor to:
  determine a thickness of a tissue section from the stained input slide; and
  document the thickness of the tissue section.

8. The apparatus of claim 1, wherein the memory contains instructions further configuring the at least a processor to segment, using a computer vision module, a slide into distinct regions as a function of predefined criteria.

9. The apparatus of claim 1, wherein the memory contains instructions further configuring the at least a processor to:
  calculate an overlap metric of the stained input slide and the unstained slide, wherein the overlap metric quantifies an extent of alignment between the region of interest on the stained input slide and a corresponding area on a target surface of the unstained slide;
  select an optimal orientation that maximizes the overlap metric; and
  adjust the orientation of the unstained slide as a function of the optimal orientation.

10. A method for automated microdissection of tissue from slides to optimize tissue harvest from regions of interest, the method comprising:
  receiving, by at least a processor, a stained input slide;
  identifying, by the at least a processor, a region of interest on the stained input slide, wherein identifying the region of interest comprises using a registration module to:
    log a sample size from the stained input slide;
    document a plurality of slides sectioned for analysis;
    predict a size and a location of the region of interest as a function of the sample size and the number of slides; and
    register the identified region of interest across a plurality of unstained slides;
  generating, by the at least a processor, a segmentation map of the region of interest as a function of a segmentation algorithm; and
  registering, by the at least a processor, a segmented region of interest, as a function of the segmentation map, onto an unstained slide, wherein registering the segmented region of interest onto the unstained slide comprises:
    determining an orientation of the unstained slide corresponding the segmented region of interest of the stained input slide;
    recording the orientation of the unstained slide relative to a reference plane; and
    registering the segmented region of interest to the unstained slide.

11. The method of claim 10, further comprising:
receiving and holding, using a platform, the unstained slide.

12. The method of claim 10, further comprising:
identifying, using a tissue extraction module, the tissue of interest within the registered region of interest on the unstained slide;
analyzing, using the tissue extraction module, the tissue of interest to determine an extraction location; and
extracting, using the tissue extraction module, the tissue of interest as a function of the extraction location.

13. The method of claim 10, further comprising:
extracting, by the at least a processor, features and pattern characteristics of the region of interest using a supervised learning machine learning algorithm.

14. The method of claim 10, further comprising:
identifying, by the at least a processor, a projected region of interest on the unstained slide using a convolutional neural network.

15. The method of claim 10, further comprising:
classifying, by the at least a processor, segments within the segmentation map using a classification model, wherein classifying the segments further comprises:
identifying a plurality of tissue density criteria by analyzing an annotated tissue image dataset, wherein the analysis comprises machine learning algorithms configured to recognize variations in tissue density as a function of pixel intensity and color heterogeneity across different tissue types;
identifying a target area for tissue extraction by applying a feature extraction algorithm, wherein the feature extraction algorithm is configured to evaluate the segmented regions against the identified tissue density criteria and determine an area that matches the identified tissue density criteria for tissue extraction; and
discarding regions of a low confidence level in the tissue, wherein the confidence level is configured to assessed to fall below a predetermined threshold specific to unstained tissue characteristics.

16. The method of claim 10, further comprising:
determining, by the at least a processor, a thickness of a tissue section from the stained input slide; and
documenting, by the at least a processor, the thickness of the tissue section.

17. The method of claim 10, further comprising:
training, by the at least a processor, segment a slide into distinct regions as a function of predefined criteria using a computer vision model.

18. The method of claim 10, further comprising:
calculating, by the at least a processor, an overlap metric for the stained input slide and the unstained slide, wherein the overlap metric quantifies an extent of alignment between the region of interest on the stained input slide and a corresponding area on a target surface of the unstained slide;
selecting, by the at least a processor, an optimal orientation that maximizes the overlap metric; and
adjusting, by the at least a processor, the orientation of the unstained slide as a function of the optimal orientation.

\* \* \* \* \*